Aug. 25, 1959     H. THOMAS     2,901,130
AUTOMOTIVE VEHICLE UNDERGROUND STORAGE DEVICE
Filed April 8, 1957     8 Sheets-Sheet 1

Fig. 1.

INVENTOR.
HENRY THOMAS
BY

Fig. 2.

Aug. 25, 1959  H. THOMAS  2,901,130
AUTOMOTIVE VEHICLE UNDERGROUND STORAGE DEVICE
Filed April 8, 1957  8 Sheets-Sheet 3

INVENTOR.
HENRY THOMAS
BY
M. Talbert Dick
atty.

Aug. 25, 1959          H. THOMAS          2,901,130

AUTOMOTIVE VEHICLE UNDERGROUND STORAGE DEVICE

Filed April 8, 1957          8 Sheets-Sheet 4

INVENTOR.
HENRY THOMAS
BY
M. Talbert Dick
atty.

Aug. 25, 1959  H. THOMAS  2,901,130
AUTOMOTIVE VEHICLE UNDERGROUND STORAGE DEVICE
Filed April 8, 1957  8 Sheets-Sheet 5

INVENTOR.
HENRY THOMAS
BY
M. Talbert Dick
atty.

Aug. 25, 1959  H. THOMAS  2,901,130
AUTOMOTIVE VEHICLE UNDERGROUND STORAGE DEVICE
Filed April 8, 1957  8 Sheets-Sheet 6

INVENTOR.
HENRY THOMAS
BY
M. Talbert Dick
atty.

Fig. 16.

Aug. 25, 1959     H. THOMAS     2,901,130
AUTOMOTIVE VEHICLE UNDERGROUND STORAGE DEVICE
Filed April 8, 1957     8 Sheets-Sheet 8

INVENTOR.
HENRY THOMAS
BY
M. Talbert Dick
atty.

United States Patent Office 2,901,130
Patented Aug. 25, 1959

2,901,130

AUTOMOTIVE VEHICLE UNDERGROUND STORAGE DEVICE

Henry Thomas, Omaha, Nebr.

Application April 8, 1957, Serial No. 651,246

15 Claims. (Cl. 214—16.1)

This invention relates to a self serve automotive vehicle storage means and more particularly to one that stores the vehicles in available underground areas such as under the streets and/or side walks of towns and cities.

With the great increase in the numbers of automobiles, many almost unsolvable problems have arisen. In substantially all municipalities there is just not enough parking space for vehicles. By permitting street parking the roadway becomes so reduced that all traffic is seriously hampered. The problem is further increased by cars maneuvering into and out of street parking. Many places have attempted to partially solve the difficulty by tearing down buildings for parking areas. Another method has been the building of parking buildings having multiple parking floors. However, such procedures are not only costly but take up valuable down town real estate. Furthermore, such means is costly to operate and maintain.

Therefore, one of the principal objects of my invention is to provide a vehicle parking means that utilizes space not now used for other purposes.

More specifically, the object of my invention is to provide herebefore non-used areas under the streets and/or walks of municipalities.

A further object of this invention is to provide a city storage means that is self serve, thereby eliminating local service personnel.

A still further object of my invention is to provide a vehicle parking device that makes for more available roadway for moving traffic.

A still further object of this invention is to provide a vehicle parking means for municipalities that is profitable to the municipality.

A still further object of my invention is to provide a vehicle parking apparatus that will protect the vehicle from weather conditions.

A still further object of this invention is to provide a vehicle parking device that will charge according to the time a given vehicle is in storage therein.

A still further object of my invention is to provide a vehicle parking apparatus that prevents unauthorized persons from access to the vehicle while in storage.

A still further object of this invention is to provide a multiple vehicle parking means that will indicate whether or not space is available.

A still further object of this invention is to provide a multiple vehicle parking apparatus that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
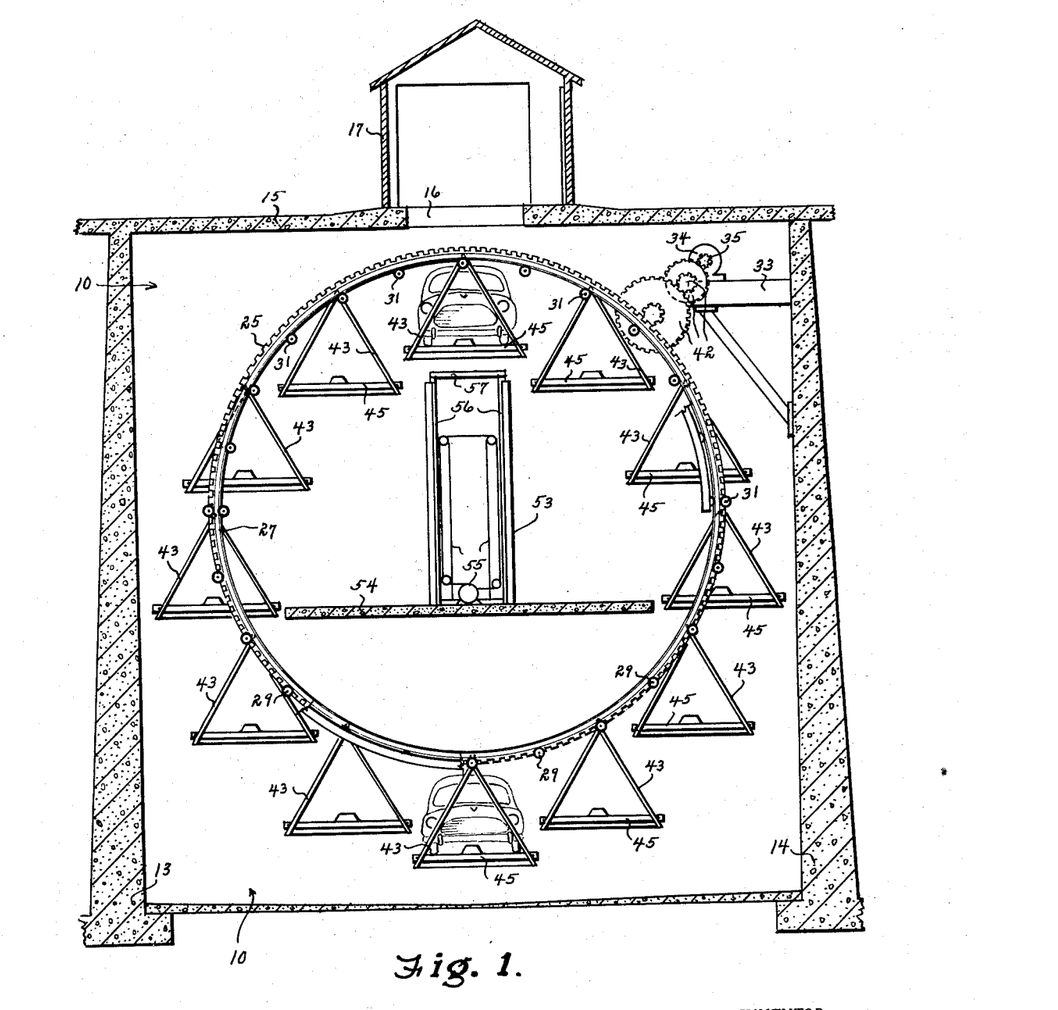
Fig. 1 is an end view of my apparatus in use.
Figure 2:
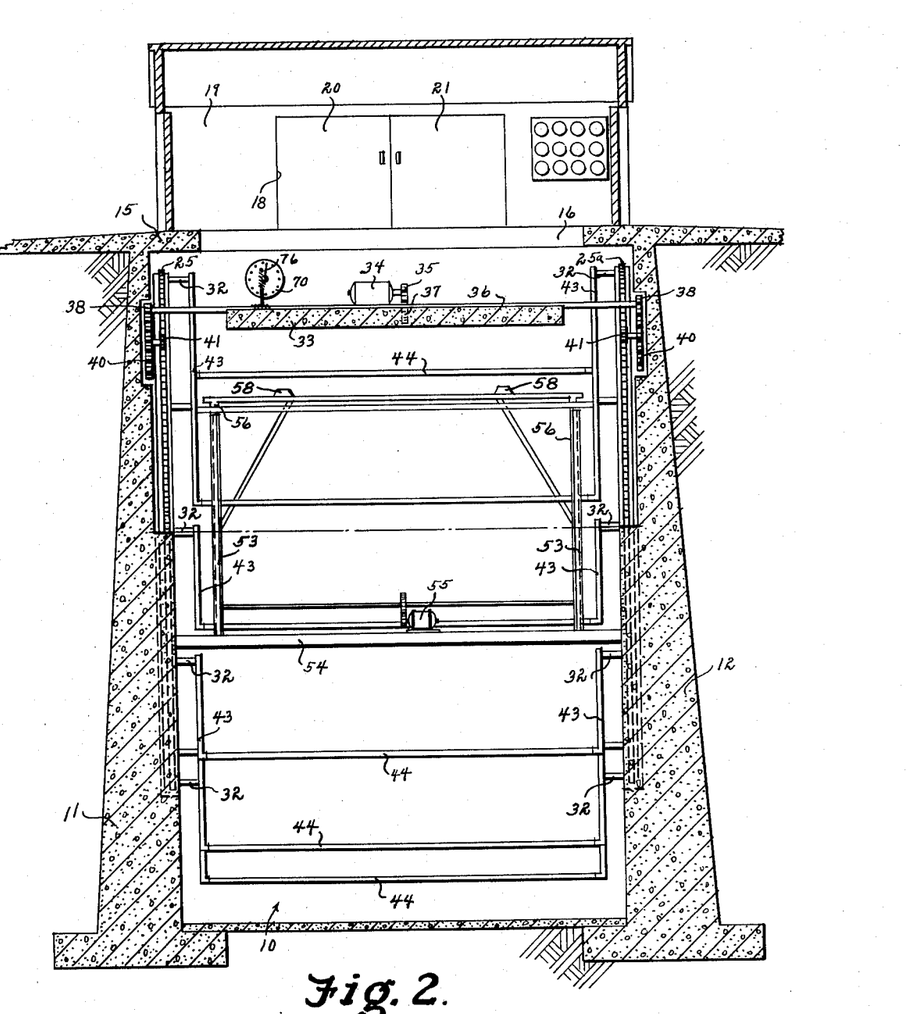
Fig. 2 is a side view of the apparatus and more fully illustrates its construction.
Figure 6:
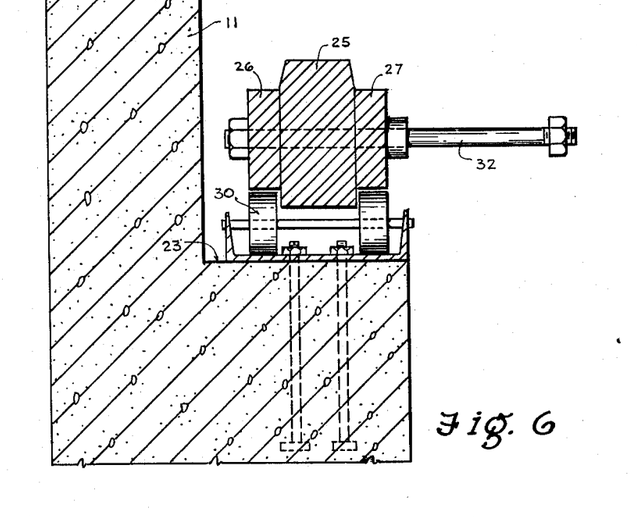
Fig. 6 is an enlarged cross sectional view of the upper portion of one of the supporting gear rings taken on line 6—6 of Fig. 3.
Figure 7:
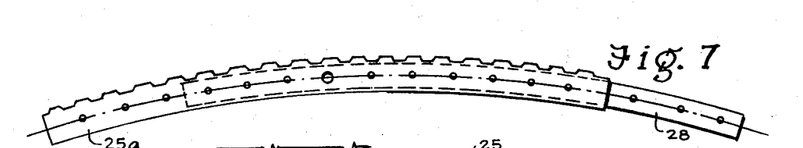
Fig. 7 is an enlarged sectional view of one of the supporting gear rings and more fully illustrates its construction.
Figure 8:
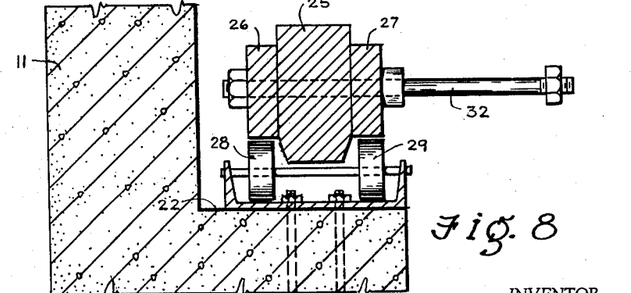
Fig. 8 is an enlarged cross sectional view of the lower portion of one of the supporting gear rings and is taken on line 8—8 of Fig. 3.

In these drawings I have used the numeral 10 to designate an underground pit having the four concrete side walls 11, 12, 13 and 14. The numeral 15 designates a concrete top having the opening 16. Over this opening is a suitable housing 17 having an entrance opening 18 in its wall 19. The numerals 20 and 21 designate two sliding doors for closing the opening 18 at times. In the lower inside area of each of the sides 11 and 12 is a substantially one half circle ledge 22 open at its top. This ledge is shown in Fig. 8. Also in the upper inside area of each of the sides 11 and 12 is a substantially one half circle ledge 23 open at its bottom, as shown in Fig. 6. Each of these two pairs of ledges together provide substantially a circle as shown in Fig. 2. Adjacent the side 11 is a supporting ring gear 25. Adjacent the side 12 is a supporting ring gear 25a. A ledge 22 extends under the lower portion of each of these ring gears and a ledge 23 extends inside and under the upper portion of each of these ring gears. On each side of each of the ring gears is a bearing ring portion designated by the numerals 26 and 27, respectively. Rotatably mounted on the ledge 22 is a plurality of spaced apart pairs of roller wheels 28 and 29. The bearing ring portion 26 rides on the roller wheels 28 and the bearing ring portion 27 rides on the roller wheels 29. The teeth of the gear wheel extend radially from its periphery and between the rollers 28 and the rollers 29, as shown in Fig. 8. Rotatably mounted on the ledge 23 is a plurality of spaced apart pairs of roller wheels 30 and 31. The under side of the upper portion of the bearing ring portion 26 rides on the roller wheels 30. The under side of the upper portion of the ring portion 27 rides on the roller wheels 31. Thus the two supporting ring gears 25 and 25a are vertically rotatably mounted with the ring gear 25 adjacent the wall 11 and the ring gear 25a adjacent the wall 12. Extending inwardly from each supporting ring gear are twelve evenly spaced apart stub shaft 32. The stub shafts on one supporting ring gear are diametrically opposite from the stub shafts on the other supporting ring gear. Rotatably supported on each stub shaft at its apex is an A-frame 43. Each of the oppositely disposed A-frames are tied together by braces 44. Thus, there will be twelve unit frames supported by the two gear rings and inasmuch as they are hinged at their tops, they will always be upright regardless of the rotation of the supporting gear rings, as shown in Fig. 1. The numeral 33 designates a bracket in the pit supporting an electric motor 34 having a gear wheel 35 on its shaft. The numeral 36 designates a shaft extending past both of the ring gears and having a gear wheel 37 in mesh with the gear wheel 35. This shaft 36 has a gear wheel 38 at each end. Each gear wheel 38 is in mesh with a gear wheel 40 which is connected to a small gear wheel 41. The two gear wheels 41 are in mesh with the teeth of the two supporting ring gears, respectively, as shown in Fig. 2. The numeral 42 designates meshed reduction gears connecting the gear 35 with the shaft 36. These chain of gears serve as reduction gears and when the motor 34 is running, the two supporting ring gears will be rotated.

Figures 3, 4, 5:
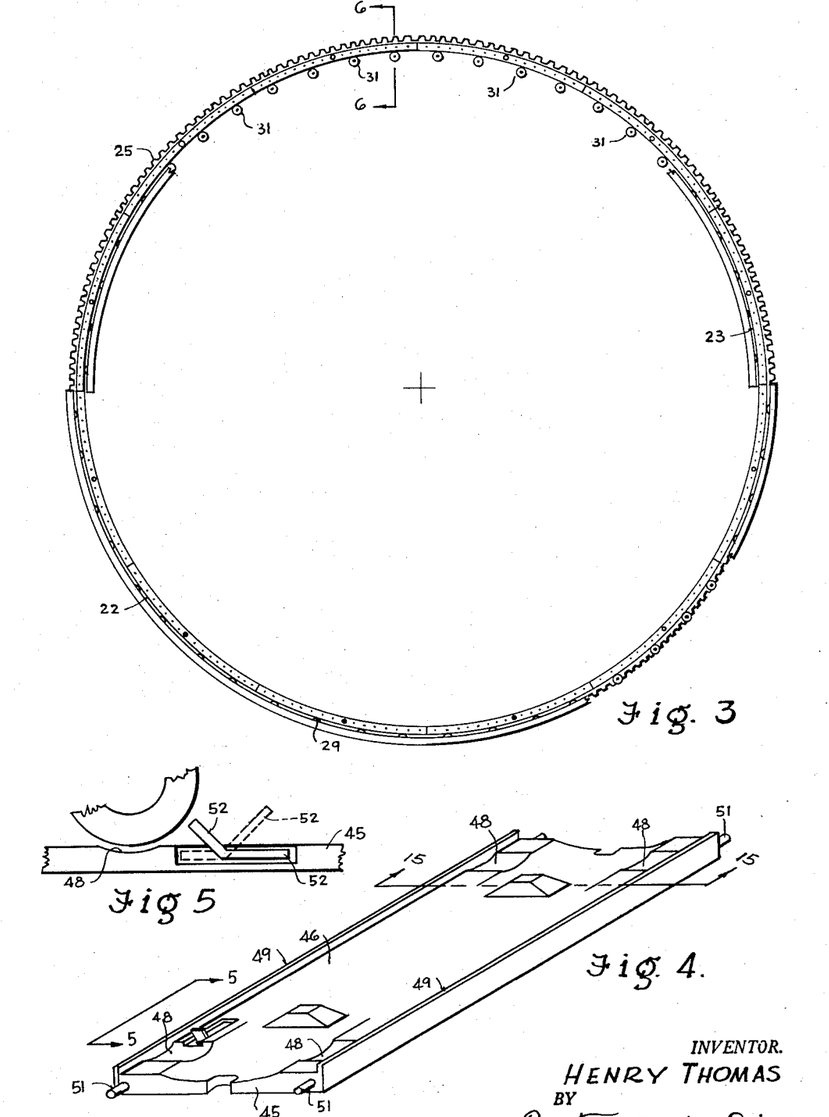
Fig. 3 is an enlarged plan view of one of the gear supporting rings.
Fig. 4 is an enlarged perspective view of one of the vehicle supporting bases.
Fig. 5 is an enlarged side sectional view of a portion of the supporting base taken on line 5—5 of Fig. 4.
Figure 15:
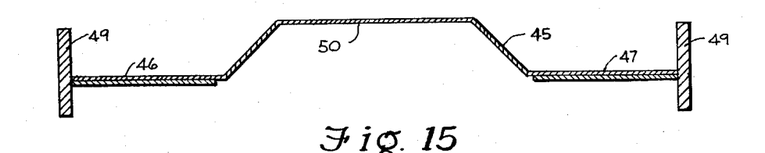
Fig. 15 is a cross sectional view of the vehicle supporting base taken on line 15—15 of Fig. 4.

The numeral 45 designates a vehicle supporting base for each of the pairs of twelve A-frame units. This base has the two wheel runways 46 and 47 and in which are wheel receiving depressions 48, as shown in Fig. 4. On the inner side of each of the wheel runways is a guard railing 49. The cross braces of the base each have a cone shaped depression 50 on its under side, as shown in Fig. 15. At each of the four corners of the base is a longitudinally extending rod lug projection 51. Back of at least one of the wheel depressions 48 is an angle stop 52 pivoted at its center to the base 45, as shown in Fig. 5. When a vehicle is driven onto the base, this stop will be as shown in Fig. 5, but as the wheel passes over it, it will move to a position shown by the broken lines. After the wheel has passed over it, it will resume its normal position and prevent the vehicle from moving rearwardly. Each of the bases 45 normally rest on the lower areas of the A-frame units with the projections 51 at one end engaging the sloping side rails of one A-frame and the projections 51 on the other end engaging the side rails of the oppositely arranged A-frame. Thus, if the base were lowered onto an A-frame hangar unit, these lugs 51 would engage the sloping side rails of the unit, thereby self-centering the base 45 on its respective unit. The numeral 53 generally designates a lifting ram jack mounted on a supporting web 54 that extends through and between the ring gears 25 and 25a as shown in Fig. 1. This lifting means 53 may be of any suitable type and may be hydraulically or mechanically actuated for raising or lifting the bases 45. In the drawings, I show a mechanical device having a cable and electric motor 55 for lowering or raising the movable part 56 of the lifting means 53. The numeral 57 designates the lifting and lowering platform on the top of the movable portion 56. This may be accomplished by the ordinary and well known "block and tackle" method, i.e., the platform 57 which is slidable in a frame has its lower end connected to two cables which extend first upwardly to extend over pulley wheels and then downwardly to be operatively connected to the reversible driveshaft of the electric motor whereby when the motor shaft is being rotated in one direction the cables will be wound upon the shaft and raise the platform and when the motor shaft is rotated in the opposite direction it unwinds the cables to permit the platform to descend. This platform has two cone shaped elements 58 on its top adapted to extend into and engage the depressions 50 of the base 45 during the lowering or raising of the base 45.

The herebefore described parts of my device constitute the basic apparatus. Various automatic means and controls may be associated with the device, some of which are herein later described. Basically, of course, the operation requires the rotation of the supporting ring gear wheels 25 and 25a and a power means for lowering a vehicle onto and lifting it from an A-frame cradle unit.

The operation of my device thus far described is as follows: The lifting and lowering means 53 is actuated to move upwardly, engage a base 45, and lift it from an A-frame support unit up into the opening 16. During this operation the base 45 cannot move laterally in any direction due to the elements 58 engaging the depressions 50 of the base 45. With the base 45 in the ground surface opening 16, the vehicle to be parked is driven onto the base 45 where its wheels will engage the depressions 48. The lifting and lowering device 53 is then actuated to move downwardly thereby bringing with it the platform 45 and the vehicle to be stored. During this downward descent of the base 45, its projections 51 will be at each side of the slanting rail frames of the A-frame members, thereby automatically guiding the base 45 onto the A-frame unit and center the same thereon. With the further downward movement of the lifting and lowering means, it will clear the A-frame unit, as shown in Fig. 1. Next, the motor 34 may be actuated to rotate the supporting ring gears, thereby moving the A-frame unit and vehicle just received into a position from directly under the opening 16. This procedure may be followed until all of the A-frame units have been filled with vehicles for storage. To remove a vehicle from storage, the procedure is reversed, i.e., the motor 34 is used to bring the vehicle to be removed to the extreme top of the underground apparatus and directly below the opening 16. Next, the lifting and lowering means 53 is actuated to bring the base 45 into the opening 16, at which time the vehicle will be above the surface 15 and may be driven forwardly and off of the base 45. If a housing 17 is above the opening 16, it should have an outlet door opposite from an entrance door so that a car can be driven into the building and then driven out of the building into the same direction.

These entrance and exit openings should have doors, and are not to be confused with the doors 20 and 21 which are at the side of the building adjacent the sidewalk. Without automatic control means, the device would require one or more operators to cause the actuation of the motor 34 and the lifting and lowering means 53. However, various automatic means may be employed to operate the apparatus and I have provided several illustrations. Perhaps first and foremost, none of the doors of the house 17 can be open until a base 45, with or without vehicle, is in the opening 16. For most municipalities, it will be desirable to have the device a self-serve one and also coin operated, in order that the installation of the device will amortize itself and also show profit. Obviously, if a charge is made for parking, a mechanism must be used that will indicate the time the vehicle is parked and the cost for such time interval. In this connection, the control means must also indicate an overparking situation. Furthermore, to prevent an unauthorized person from stealing a parked vehicle, a key mechanism must be associated with the control mechanism. Still another facility should be a signal means to indicate to motorists whether or not there is a vacancy.

Figures 12, 13:
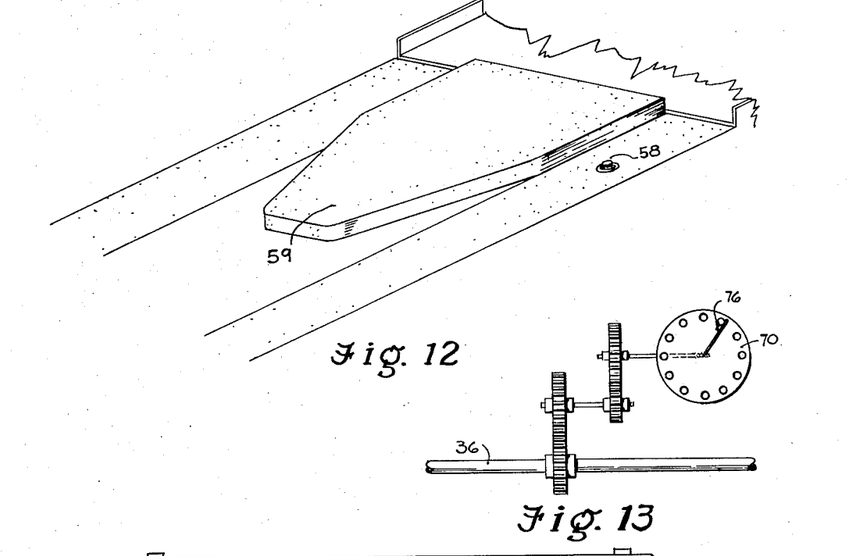
Fig. 12 is a perspective view of the approach island.
Fig. 13 is a front view of the electric contact selector.
Figure 14:
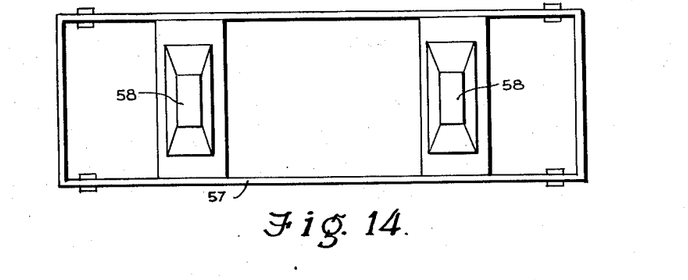
Fig. 14 is an enlarged top plan view of the lifting and lowering platform.
Figure 16:
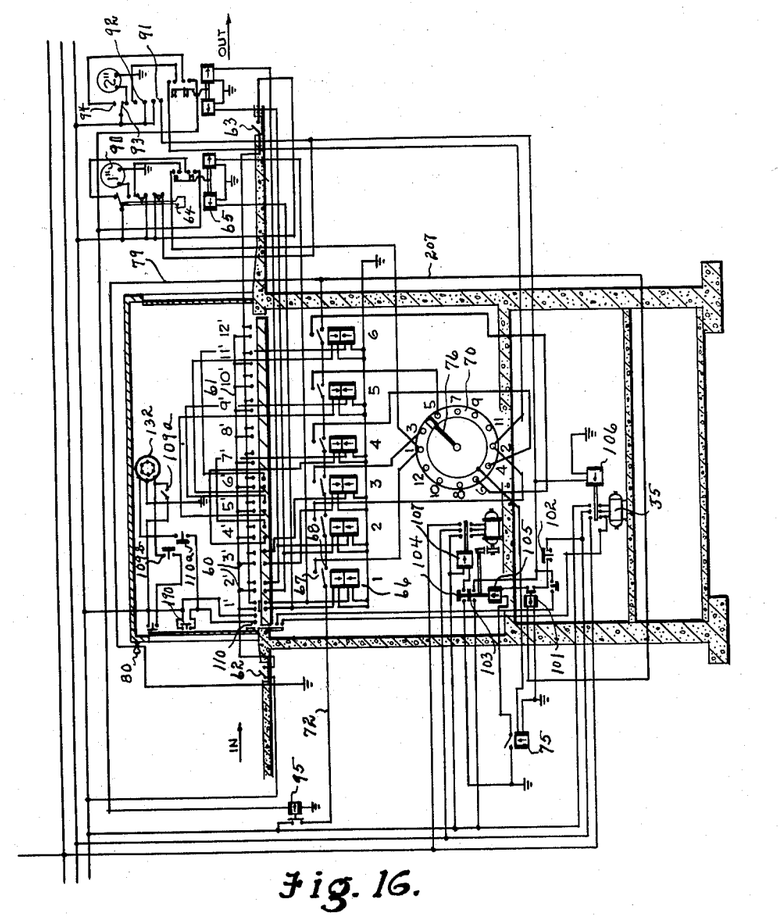
Fig. 16 is a diagrammatical showing of the wiring diagram.
Figures 17, 18, 19:
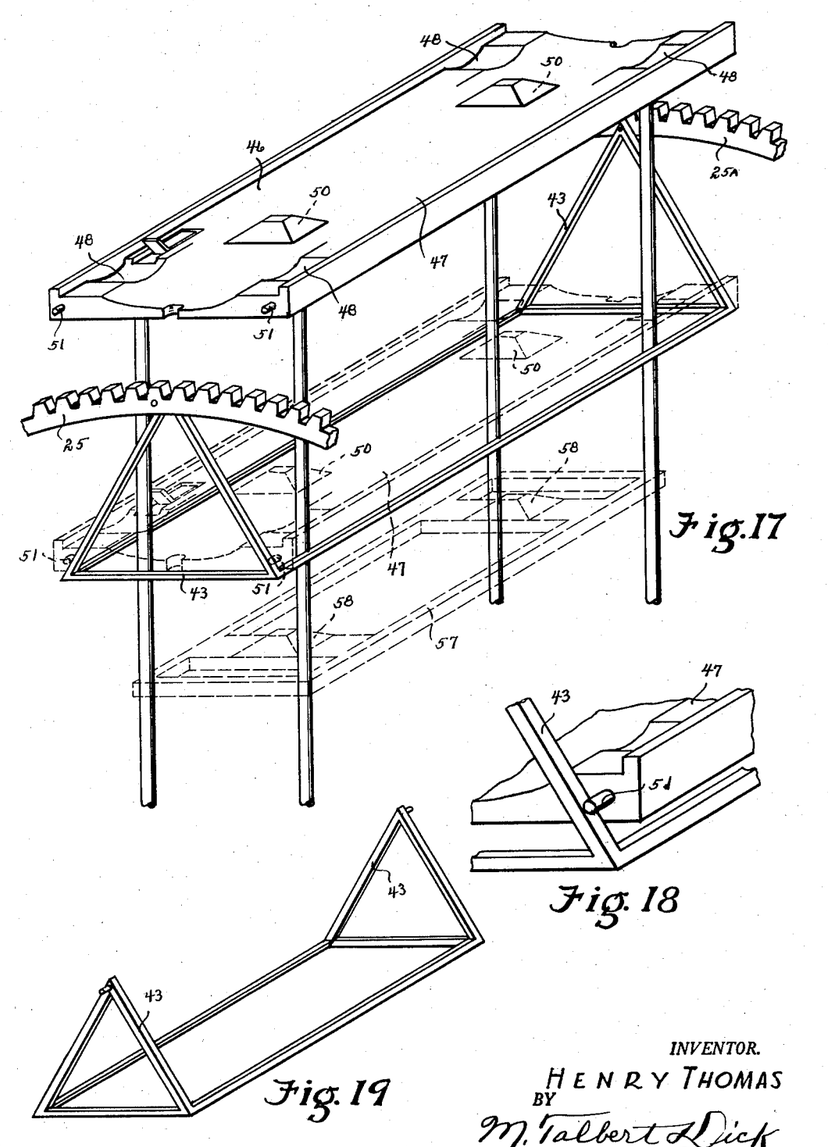
Fig. 17 is an enlarged perspective view of one of the vehicle platforms that has been raised to an elevated position.
Fig. 18 is an enlarged perspective view of one corner end of the platform illustrating how its lugs engage the A-frame.
Fig. 19 is an enlarged perspective view of one of the A-frames.

Similar to various automatic devices, the controls of my apparatus are electronic. If the entrance and exit doors of the building are closed except when a vehicle is entering or leaving, a wheel depressible electric switch 58 would have to be in the approachway. An island 59 may be used to direct the vehicle properly, as shown in Fig. 12. If the doors are to be automatically held open, except when a base 45 is not in the opening 16, some such type of switch is still necessary. The wire closed by the switch has a common contact with all the buttons designated 60. These buttons marked one to twelve are on the board 61 and have the two switch buttons 62 and 63. The button 63 is not actuated by the entrance connection 62. The exit button 63 has a connection with all buttons affected by the vehicle exit. Each A-frame unit has a built-in extension which contacts both of the two buttons when it is in an upward position and the base 45 is in the opening 16. The switch button 62 sends the electric impulse through to the key 64 on the central panel which corresponds to the number of the button box being pressed or contacted. This acts to uncover the right key through solenoid 65 in the control unit of the panel board. To conserve space, only two units on the panel are shown in Fig. 16, but obviously the panel would contain as many units and keys as there are storage space cradles. Button 62 (which may be switch 58), also electrically connects board 66. This board is also numbered one to twelve and is an important part of the selector. It has twelve two-position relays designated 67 and 68. The position of these relay switches distinguish between loaded and unloaded A-frame unit cradle carriers. When the switch is pulled by the upper solenoid into 68 by action of a switch at 62, the carrier is loaded and is no longer connected to a switch button on the stopper system at 70. The stopper will not act on that particular button until a key 64 is used on the control panel by a customer who has come for his car. When he does take his car out, the action of the exit switch throws its particular switch on board 66 back to "empty" position by action of the lower solenoid. In the stopper system, a common feed wire 72 feeds the relay boxes one to twelve on the board 66 in series and connecting directly to the relay number one. When relay number one is in top or 67 position, it makes a closed circuit through to the button number one of 70. When the cradle A-frame number one is in loading position, a vehicle is driven thereon and contact 62 is made at time of vehicle entrance. This throws the first relay of the board 66 to a closed position at 68, thus breaking connection to the first button at 70 and making connection through the second relay to the number two button in 70. When the first cradle frame is lowered (by action of taking the key from the control panel), the same will be accomplished by the motor 55. Now in 70, the arm 76 is geared to the shaft 36 in a ratio that causes it to move around the face of 70 in the same length of time it takes the supporting ring gears 25 and 25a to make one revolution. All buttons at 70 will be engaged in one such revolution. Since the second is the only one now energized, it will not stop until button two is reached. This will be on the opposite side of the carrier so that the unit which is similar to that of a Ferris wheel will be kept in balance. The same thing happens to relay number two at 66. The number two relay is thrown from contact 67 to 68 and the contact feeds to number three relay. This procedure of action and vehicle loading continues until all twelve car stall cradles are loaded, and contacts will be made through the twelfth relay when contact connects the wire 79 to a light 80 on the building and which indicates the storage means is filled up. When a car is removed, this connection is broken, the light goes out, and thereby indicates an available storage space. This is made possible by the fact that wire 79 which is connected to 207 would break the circuit operating number 101 relay whereby otherwise the power motor would start. However, the side doors would not open until the key was used and a platform reaches into the opening 16, then doors open automatically.

The electric control board shows only two key switch and time controls and only the schematic wiring in this diagram. The mechanical parts are nearly all left out in order to show the wiring more clearly. The clock, indicated by 90 runs when the key is out. The clock unit number 2 shows wiring with key out. The unit shown at 90 shows wiring with key in its place. Lug on the key would contact contact 91, either when it turned to take it out, or when it is turned after putting it in, to start the lift motor 55 in this diagram.

Lug on key makes a contact 92 which goes direct to selector stopper system 70 so when arm 76 reaches the button energized, the power motor will stop, leaving carrier which the key called for in position to be brought up by the lift.

At the point of the key is a type of switch which makes a connection in both positions. When the key is out, as shown, the clock connection is made, thus causing the clock motor to run. In 91 the key is in breaking the clock motor connection 93, and making contact 94, which energizes relay 95, breaking the empty circuit feed at 95, thus leaving the key in temporary control. Relay 101 breaks the circuit to magnetic brake mechanism. This is done by wire 79 which can only be fed when all relays on board 66 are in 68 position. This condition is overcome at such time as a key is used and relay 95 breaks common feed to all relays on board 66. This breaks circuit to relay 101, allowing contacts to return to their made position.

Switch 102 is operated by the lift only in the down or bottom position. This switch is closed when the lift is down and open when the lift is up, insuring storage or power motor cannot run with the lift in the up position. This switch feeds the brake mechanism which has to be energized before the power motor will run.

Switch 103 is a switch which is operated by linkage with the brake mechanism. It makes use of the travel or stroke of the brake arm to close its contacts. This switch must be a type of switch which makes its circuit only momentarily and also makes its circuit only when the brake moves from the released to the applied position.

Relay 75 breaks the circuit to the magnetic brake mechanism and is controlled only from the selector stopper buttons.

Switch 104 is a switch whose contacts are closed when the brake is released and completes the circuit to the power motor starter or relay.

Relay 105 is the relay which operates the brake mechanism.

Relay 106 is the relay or starter which operates the lift motor.

Relay 107 is the power motor starter or relay.

Switch 109 is the switch which feeds the entrance door motor when going from opened to closed position.

Switch 109a is a switch which by-passes switch 109 and is operated by a customer for only a few seconds. At such times as the doors have left the open position, the customer need not hold this switch handle.

Switch 109 is the switch which stops the doors when they have reached the closed position.

Switch 110 is a switch operated by the lift when it reaches the top position. It starts the entrance doors from the closed to the opened position.

Switch 10a is the switch which stops the doors when they arrive at the open position.

The numeral 132 designates the door's motor.

Figure 9:
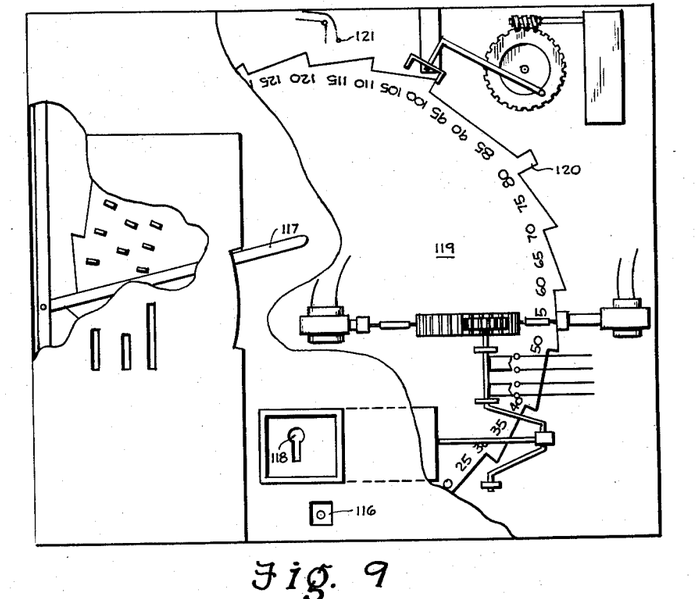
Fig. 9 is an enlarged plan sectional view of the timing mechanism, coin and key phase.
Figures 10, 11:
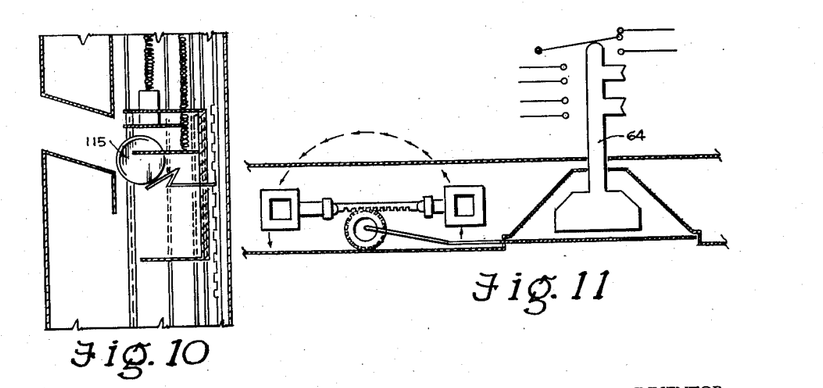
Fig. 10 is a side sectional view of the coin mechanism.
Fig. 11 is a plan view of the key mechanism.

Any type of coin control means may be used. In Figs. 9 and 10, I show a conventional type for taking the proper amount of coins 115 according to the reading through the window 116. After the coins have been inserted, the lever 117 is moved downwardly and, not until this stage, can the key originally taken by the customer be inserted into the key hole 118 and turned to set the hereinbefore described electrically actuated controls into motion. The key contacts, first have both entrance and exit doors closed, the correct vehicle brought to the surface, and entrance and exit doors opened. Only after the car has been brought to the surface can the side doors 20 and 21 be opened and the customer reach his car. The clock or charge face 119 is of the clock spring ratchet type. A lug 12 may be on the face and when engaging the switch 121, a light will come on, showing overtime storage.

The installation of my device will serve the customer and collect the nominal rate of storage from him at the end of any storage period. If the various automatic controls are used, this service will eliminate the services of an attendant. Private parking facilities may or may not use the automatic electronic controls. If such controls are used, the clock and charge mechanism may be designed to take care of any reasonable length of time. While I show the supporting ring gears 25 and 25a, obviously, various types of chains and sprockets could be substituted therefor. By the use of the sliding doors 20 and 21, the key control panel may be located back of one of the doors, as shown in Fig. 2. By this arrangement of parts, the doors must be in closed position to expose the coin and key panels. This makes for safety and means that the one leaving his car cannot obtain his key until after the doors have been closed. Once the doors have been closed, the customer removes and takes with him his respective key. When the customer returns to obtain his vehicle, he first must close the doors to get at the key or panel board. He next must pay the charge indicated near his keyhole when zero shows at 116, he may insert the key at 118 and turn it and wait for doors to automatically open revealing his car at surface level. Upon the passage of his vehicle from the housing, there will be at least one vacancy and the signal light outside the housing will so indicate. As before indicated, the various coin control means may be employed. In Fig. 9, I show a suggested system. The customer will read his charge through the opening 116. Only by putting the necessary amount of coins in the coin slot and moving the lever 117 downwardly will he be able to uncover the keyhole and insert his key. The customer will not be able to open the doors 20 and 21 until he has rotated the key and his vehicle has been elevated into the house 17. Regardless, however, of what type or structure of electronic controls is employed, there are certain minimum services that they must employ. First, there must always be a base 45 in the ground opening 16. Second, only the customer's particular key can be used to bring that customer's vehicle to the ground surface. Third, the operation of the key must cause, if necessary, the rotation of the supporting ring gears 25 and 25a and the operation of a lifting and lowering means, such as 53. If the controls include a coin mechanism, then it must be necessary to time the period for which the vehicle is stored. Also, the proper coins to pay for the storage must be inserted and, until this has been done, the customer cannot obtain his stored vehicle.

Some changes may be made in the construction and arrangement of my automotive vehicle underground storage device without departing from the real spirit and purpose of my invention, and it is my intention to cover by my claims, any modified forms of structure or use of mechanical equivalents which may be reasonably included within their scope.

I claim:

1. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, and a means for rotating said two circular members.

2. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, an A-frame means having side rails extending upwardly and inwardly pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, and a means for rotating said two circular members.

3. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, an A-frame means having side rails extending upwardly and inwardly pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, and a means for rotating said two circular members; each of said base platforms having projections for slidably engaging the side rails of said A-frame means for centering it onto its A-frame means while it is being lowered by said lifting and lowering means.

4. In a vehicle storage means, a compartment having an opening in its top, a housing over the opening of said compartment, doors in said housing, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, and a means for rotating said two circular members.

5. In a vehicle storage means, a compartment having an opening in its top, a housing over the opening of said compartment, doors in said housing, two vertical spaced apart rotatably mounted circular members in said compartment, a plurality of spaced apart stub axles on each of said circular members; each stub axle on one circular member extending toward a diametrically postioned stub axle on the other circular member whereby a plurality of pairs of stub axles will be provided, a frame means pivoted at it stop to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, and a means for closing said doors when there is no base platform in the opening of said compartment.

6. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of selectively lifting any one of said base platforms from its frame means into the opening of said compartment or lowering said base platform from said opennig in said compartment to its frame means, and a means for rotating said two circular members.

7. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, depressions in the under side of each of said base platforms, and projections on said lifting and lowering means capable of entering and engaging said depressions in said base platforms.

8. In a vehicle storage means, a compartment having an opening in its top, two vertical spaced apart rotatably mounted circular members in said compartment, a plurality of spaced apart stub axles on each of said circular members; each stub axle on one circular member extending toward a diametrically postioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, cone shaped depressions in the under side of each of said base platforms, and cone shaped projections on said lifting and lowering means capable of entering and engaging said depressions in said base platforms.

9. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, and a coin controlled electronic means associated with said lifting and lowering means and said means for rotating said two circular members.

10. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, and a coin and key controlled electronic means associated with said lifting and lower means and said means for rotating said two circular members.

11. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, and wheel depressions in the top of each of said base platforms.

12. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, guard rails on each of said base platforms, and wheel depressions in the top of each of said base platforms.

13. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, wheel depressions in the top of each of said base platforms, and a stop means adjacent at least one of said depressions.

14. In a vehicle storage means, a compartment having an opening in its top, two vertical spaced apart rotatably mounted circular members in said compartment, a plurality of spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, a means for rotating said two circular members, and a clock means for each of said base platforms indicating the time interval said base platform is supporting a vehicle.

15. In a vehicle storage means, a compartment having an opening in its top, two vertical spaced apart rotatably mounted circular members in said compartment, a plurality of evenly spaced apart stub axles on each of said circular members; each stub axle on one circular member extending toward a diametrically positioned stub axle on the other circular member whereby a plurality of pairs of stub axles will be provided, a frame means pivoted at its top to each of said pairs of stub axles, a base platform adapted to normally rest on each of said frame means and adapted to support a vehicle, a lifting and lowering means capable of lifting any one of said base platforms from its frame means into the opening of said compartment or lowering said base platform from said opening in said compartment to its frame means, and a means for rotating said two circular members.

References Cited in the file of this patent

UNITED STATES PATENTS

| | | |
|---|---|---|
| 1,940,867 | James et al. | Dec. 26, 1933 |
| 2,663,437 | Caiola | Dec. 22, 1953 |
| 2,670,860 | Cogings | Mar. 2, 1954 |
| 2,691,448 | Lontz | Oct. 12, 1954 |
| 2,738,885 | Demaline | Mar. 20, 1956 |

FOREIGN PATENTS

| | | |
|---|---|---|
| 595,435 | Great Britain | Dec. 4, 1947 |